US011596916B2

(12) United States Patent
Chandrasekaran et al.

(10) Patent No.: US 11,596,916 B2
(45) Date of Patent: Mar. 7, 2023

(54) TAILORING OF PORES IN AEROGELS USING 3D PRINTED STRUCTURES

(71) Applicant: Lawrence Livermore National Security, LLC, Livermore, CA (US)

(72) Inventors: Swetha Chandrasekaran, Dublin, CA (US); Theodore F. Baumann, Discovery Bay, CA (US); Juergen Biener, San Leandro, CA (US); Patrick Campbell, Oakland, CA (US); James S. Oakdale, Castro Valley, CA (US); Marcus A. Worsley, Hayward, CA (US)

(73) Assignee: Lawrence Livermore National Security, LLC, Livermore, CA (US)

( * ) Notice: Subject to any disclaimer, the term of this patent is extended or adjusted under 35 U.S.C. 154(b) by 1059 days.

(21) Appl. No.: 15/208,506

(22) Filed: Jul. 12, 2016

(65) Prior Publication Data

US 2018/0015436 A1    Jan. 18, 2018

(51) Int. Cl.
| | | |
|---|---|---|
| *B01J 13/00* | (2006.01) | |
| *C01B 13/18* | (2006.01) | |
| *B33Y 80/00* | (2015.01) | |
| *B33Y 10/00* | (2015.01) | |
| *C01B 32/05* | (2017.01) | |

(52) U.S. Cl.
CPC ........... *B01J 13/0091* (2013.01); *B33Y 10/00* (2014.12); *B33Y 80/00* (2014.12); *C01B 13/18* (2013.01); *C01B 32/05* (2017.08)

(58) Field of Classification Search
CPC ............................... B01J 13/091; B33Y 80/00
See application file for complete search history.

(56) References Cited

U.S. PATENT DOCUMENTS

| | | | | |
|---|---|---|---|---|
| 8,608,991 | B2* | 12/2013 | Gawryla | B01J 13/0091 264/28 |
| 8,613,204 | B2 | 12/2013 | Farmer | |
| 9,091,466 | B2 | 7/2015 | Farmer | |
| 10,196,270 | B2* | 2/2019 | Campbell | B01J 13/0091 |
| 2011/0100036 | A1 | 5/2011 | Farmer | |
| 2012/0052511 | A1* | 3/2012 | Worsley | H01B 1/08 435/7.1 |
| 2014/0060093 | A1 | 3/2014 | Farmer | |
| 2014/0113811 | A1* | 4/2014 | Stadie | C07C 9/04 502/400 |

(Continued)

OTHER PUBLICATIONS

Bauer, J. et al., "High-stength cellular ceramic composites wih 3D microarcitecture," Proceedings of the National Academy of Sciences, Feb. 18, 2014, vol. 111, No. 7, pp. 2453-2458.

(Continued)

*Primary Examiner* — Liam J Heincer
(74) *Attorney, Agent, or Firm* — Zilka-Kotab, P.C.

(57) ABSTRACT

In one embodiment, a method includes acquiring a three-dimensional printed template created using an additive manufacturing technique, infilling the template with an aerogel precursor solution, allowing formation of a sol-gel, and converting the sol-gel to an aerogel. In another embodiment, a product includes an aerogel having inner channels corresponding to outer walls of a three-dimensional printed template around which the aerogel was formed.

18 Claims, 6 Drawing Sheets

(56) References Cited

U.S. PATENT DOCUMENTS

2014/0339745 A1* 11/2014 Uram ............... B29C 39/36
 264/681
2017/0157802 A1* 6/2017 Ashton ............. B29C 33/52
2018/0015436 A1* 1/2018 Chandrasekaran ..... C01B 32/05

OTHER PUBLICATIONS

Wu, Z-S. et al., "Three-Dimensional Graphene-based Macro- and Mesoporous Frameworks for High Performance Electrochemical Capacitive Energy Storage," Journal of the American Chemica Society, 2012, vol. 134, No. 48, pp. 19532-19535.

U.S. Appl. No. 61/256,243, filed Oct. 29, 2009.

Baumann, T. et al., "Template-directed synthesis of periodic macroporous organic and carbon aerogels," Journal of Non-Crystalline Solids, 2004, vol. 350, No. 15, pp. 120-125.

Ye, S. et al., "A rapid synthesis of high aspect ratio copper nonowires or high-performance transparent conducting films," Chem. Comm., 2014, vol. 50, pp. 2562-2564.

Tang, Y., et al., "Ultralow-Density Copper Nanowire Aerogel Monoliths with Tunable Mechanical and Electrical Properties," Journal of Materials Chemistry, The Royal Society of Chemistry, 2013, vol. 1, pp. 6723-6726.

Akbulut, O. et al., "Separation of Nanoparticles in Aqueous Multiphase Systems through Centrifugation," Nano Letters, 2012, vol. 12, No. 8, pp. 4060-4064.

Jarrett, R et al., "Silver nanowire purification and separation by size and shape using multi-pass filtration," Materials Research Innovations, vol. 20, No. 2, pp. 86-91.

Raciti, D. et al., "Highly Dense Cu Nanowires for Low-Overpotential $CO_2$ Reduction," Nano Letters, American Chemical Society, 2015, vol. 15, pp. 6829-6835.

Pradel, K. et al., "Cross-Flow Purification of Nanowires," Agnew. Chem. Int., 2011, vol. 50, pp. 3412-3416.

Jung, S. et al., "Porous Cu Nanowire Aerosponges from One-Step Assembly and their Applications in Heat Dissipation," Adv. Materials, 2016, vol. 28, pp. 1413-1419.

Zhu, C. et al., "Highly compressible 3D periodic graphene aerogel microlattices," Nature Communications, 2015, pp. 1-8.

Lim, Y. et al., "Monolithic carbon structures including suspended single nanowires and nanomeshes as a sensor platform," Nanoscale Research Letters, 2013, vol. 8, No. 1, pp. 1-9.

Bauer, J. et al., "Approaching theoretical strength in glassy carbon nonlattices," Nature Materials, Apr. 2016, vol. 15, pp. 438-443.

* cited by examiner

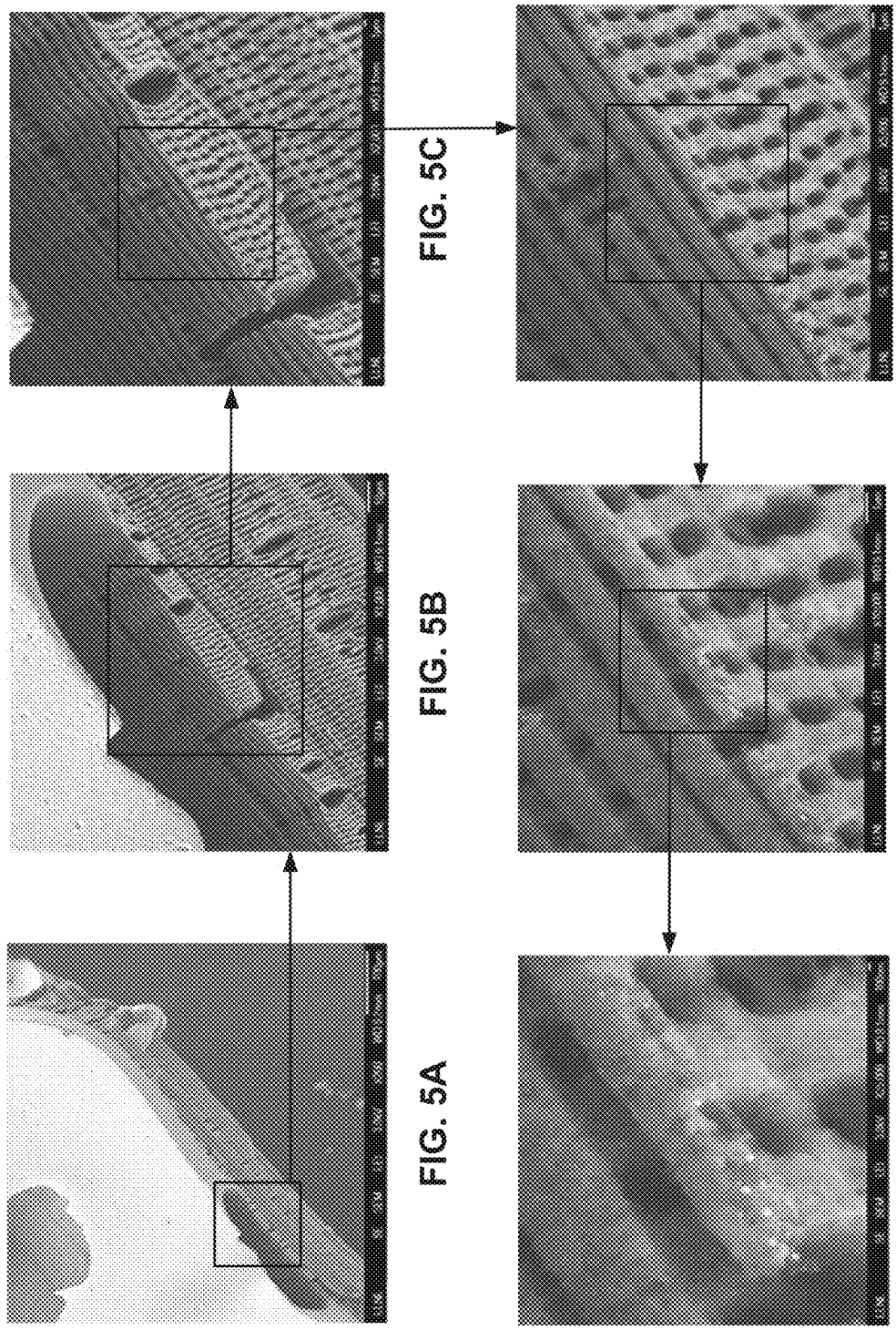

TAILORING OF PORES IN AEROGELS USING 3D PRINTED STRUCTURES

The United States Government has rights in this invention pursuant to Contract No. DE-AC52-07NA27344 between the United States Department of Energy and Lawrence Livermore National Security, LLC for the operation of Lawrence Livermore National Laboratory.

FIELD OF THE INVENTION

The present invention relates to aerogels, and more particularly, this invention relates to tailoring the pore size in aerogels using 3D printed structures as templates.

BACKGROUND

Carbon aerogels play an important role in a variety of applications.

Traditional methods of working with carbon aerogels are limited by the uniformity of the structures to a single length scale, either millimeter or micrometer or nanometer scale, resulting in a material with uniform density. For some modern applications, there may be a desire to create aerogel materials that possess extreme and precise density gradients. For other applications, it may be desirable to control the morphology of carbon aerogels at a variety of size scales, for example, the millimeter, micrometer, and nanometer. This may be used to design a gradient of density, for example, by increasing the spacing between structural elements the density may be changed from high to low. However, no solution was previously found.

SUMMARY

In one embodiment, a method includes acquiring a three-dimensional printed template created using an additive manufacturing technique, infilling the template with an aerogel precursor solution, allowing formation of a sol-gel, and converting the sol-gel to an aerogel.

In another embodiment, a product includes an aerogel having inner channels corresponding to outer walls of a three-dimensional printed template around which the aerogel was formed.

Other aspects and advantages of the present invention will become apparent from the following detailed description, which, when taken in conjunction with the drawings, illustrate by way of example the principles of the invention.

BRIEF DESCRIPTION OF THE DRAWINGS

FIGS. 5A-F is a series of scanning electron micrograph images of increasing magnification of a single sample of aerogel according to one embodiment.

DETAILED DESCRIPTION

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from h specification as well as meanings understood by those skilled in the art and/or as defined in dictionaries, treatises, etc.

It must also be noted that, as used in the specification and the appended claims, the singular forms "a," "an" and "the" include plural referents unless otherwise specified.

The following description discloses several preferred embodiments of aerogels and/or systems and methods.

In one general embodiment, a method includes acquiring a three-dimensional printed template created using an additive manufacturing technique, infilling the template with an aerogel precursor solution, allowing formation of a sol-gel, and converting the sol-gel to an aerogel.

In another general embodiment, a product includes an aerogel having inner channels corresponding to outer walls of a three-dimensional printed template around which the aerogel was formed.

A list of acronyms used in the description is provided below.

3D three dimensional
CA carbon aerogel
DiLL dip-in laser lithography
IP-DIP Nanoscribe's proprietary resist
ITO indium tin oxide
LLNL Lawrence Livermore National Laboratory
RF resorcinol-formaldehyde
TPP two-photon polymerization
UV ultraviolet There is a need for a method to create tunable three-dimensional (3D) macroscopic porous structures with deterministic multi-length scale morphology control ranging from the macroscopic object dimensions at the millimeter length scale (or above) to micro-sized building blocks made from nanoscale porous materials thus providing tunable density and pore size. The presently disclosed inventive concepts include a new process using a template strategy based on additive manufacturing techniques. Two different techniques of tailoring micro-architectured cellular materials may be involved. Additive manufacturing and aerogels from sol-gel chemistry may be combined to create 3D micro porous interconnected channels in an aerogel. Thus 3D printed parts may be employed as templates to fabricate aerogels with engineered macro-pore geometries.

Figure 1:
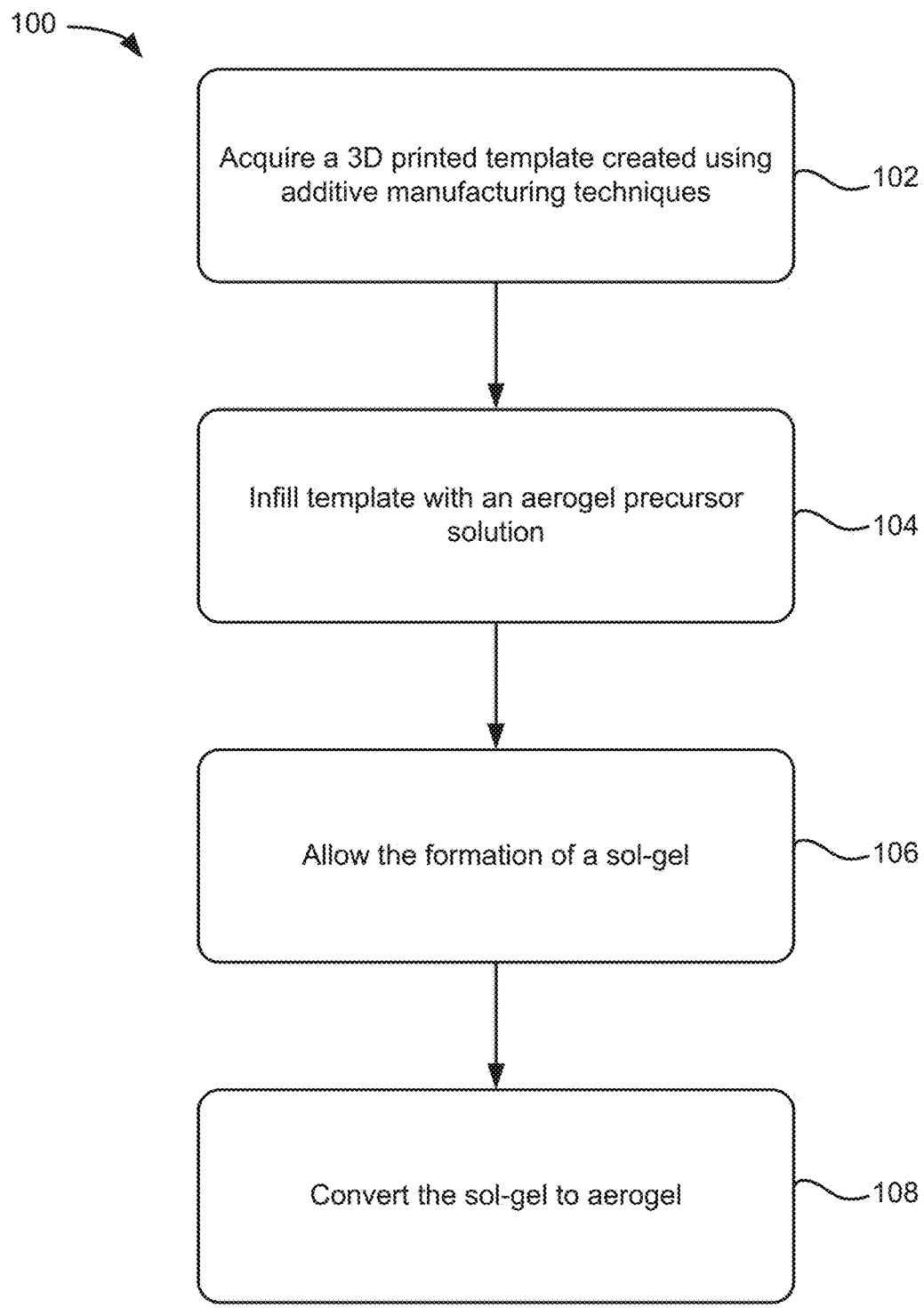
FIG. 1 is a flowchart of a method for forming an aerogel, according to one embodiment.

FIG. 1 shows a method 100 for creating an aerogel with an integrated 3D interconnected macro-porous system, in accordance with one embodiment. As an option, the present method 100 may be implemented to construct structures such as those shown in the other FIGS. described herein. Of course, however, this method 100 and others presented herein may be used to form structures for a wide variety of devices and/or purposes which may or may not be related to the illustrative embodiments listed herein. Further, the methods presented herein may be carried out in any desired environment. Moreover, more or less operations than those shown in FIG. 1 may be included in method 100, according to various embodiments. It should also be noted that any of the aforementioned features may be used in any of the embodiments described in accordance with the various methods.

An embodiment as illustrated in FIG. 1 involves a method 100 to create an aerogel using a 3D printed template created using an additive manufacturing technique, by infilling the template with an aerogel precursor solution (the sol), allowing the formation of a gel; and converting the gel to an aerogel.

In a preferred embodiment illustrated in FIG. 1, the method 100 begins with step 102 in which a 3D printed template is acquired, e.g., purchased, created, etc. The 3D printed template may be a discrete structure, a roll of template material, etc.

In one embodiment, the template may be created using additive manufacturing techniques, such as two-photon polymerization, two-photon depolymerization (where patterns are inscribed into a positive-tone photoresist), projection micro-stereolithography, direct ink writing, etc. According to one approach, a printer may be employed that utilizes two-photon polymerization (TPP) lithography and creates print structures at or below the resolution of the light source being used. The outer dimensions of the print structures may be of any size that may be printed using the selected printing technology, e.g., several millimeters, several centimeters, several meters, etc.

Furthermore, according to a preferred embodiment in which the 3D printed template of step 102 of FIG. 1 is created, a structure may be created using a photo-activated resist, for example, an acrylic-based resin or a xylene-based resin. In one approach, following solvent-mediated removal of residual resist, the structure may be cured under UV light following conventional techniques. Next, the cured structure may be removed from the substrate upon which formed, e.g., glass slide. This may be carried out using methods to remove the glass slide without damaging the 3D printed template structure, for example, but not limited to the following, 1) substrate and structure may be placed in a mixture of Zn/HCl to dissolve the substrate and gently release the structures, or 2) a razor blade may be used to wedge the disks from the substrate.

In the final sub-step of a preferred embodiment in which the 3D printed structure is created, the process may include a step whereby the 3D printed structure is air-dried. Alternatively, a super-critical drying procedure may be employed to minimize capillary forces. In some approaches, the resultant structure may be composed of polymer material and the polymer material may be solid. Moreover, the pores in the structure may be defined by the gaps where the polymer is not present.

Figure 2:
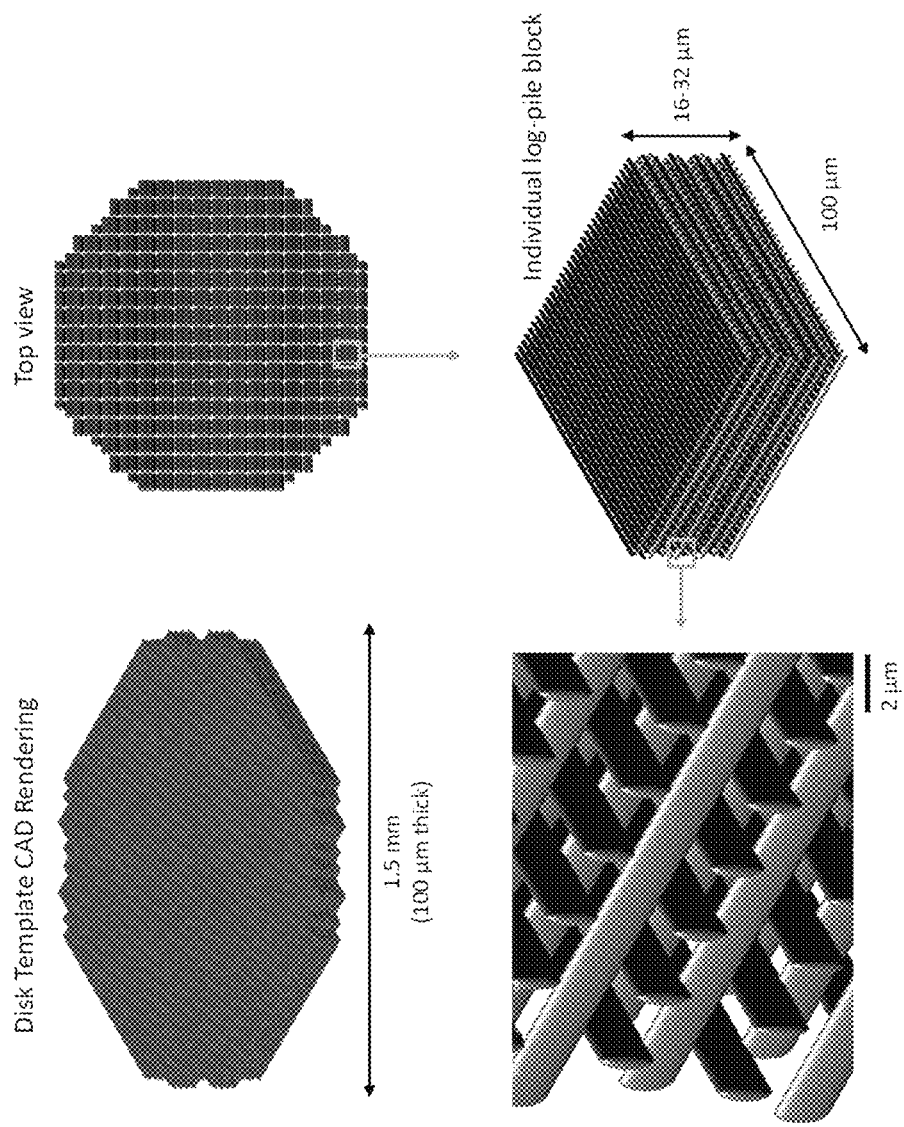
FIG. 2 is a computer-aided design rendering of a 3D printed template according to one embodiment.

FIG. 2 illustrates a Computer-aided Design (CAD) rendering of a 3D printed template that may be infilled with aerogel. A disk 3D template may have a 1.5 mm length with individual log-pile blocks of approximately 100 µm in length and 16-32 µm thick. Within the log-pile blocks, the template for the directional macro-pore highway may be engineered with about 2 µm distance between the micropores.

Figures 3A, 3B, 3C:
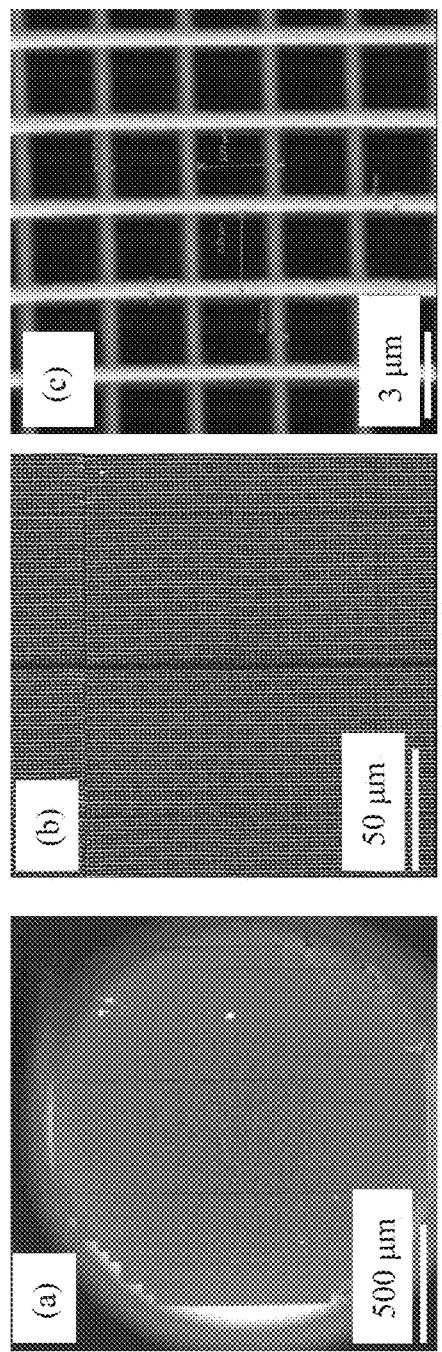
FIG. 3A is a scanning electron micrograph at relative 500 μm resolution of a 3D printed template.
FIG. 3B is a scanning electron micrograph at relative 50 μm resolution of a 3D printed template.
FIG. 3C is a scanning electron micrograph at relative 3 μm resolution of a 3D printed template.

FIGS. 3A-C illustrates an example of 3D printed structures that may be created, e.g., in step 102 of method 100 (FIG. 1). The images represent a log-pile architecture at three magnifications of scanning electron micrographs (SEM). FIG. 3C depicts an illustrative 3D printed template that may be used to form an engineered directional macro-pore system for as highways for directional mass transport.

In some approaches, the thickness of the 3D printed template created using TPP techniques may be at least 1 mm (1,000 µm).

In a preferred embodiment, infilling the gaps of the 3D printed template with an aerogel precursor solution in step 104 of method 100 (see FIG. 1) may involve creating aerogels using organic sol-gel chemistry. Any known aerogel precursor solution may be used. In some approaches, sol-gel chemistry may involve a resorcinol-formaldehyde (RF) solution or metal oxide aerogel precursors, for example, metal dichalcogenide aerogels.

In other approaches, creating aerogels using sol-gel chemistry may involve metal oxide aerogel precursors, e.g. known metal oxide aerogel precursors such as metal alkoxides. For example, a metal oxide aerogel may be created by epoxide-assisted sol gel chemistry using an alcoholic solution (e.g. ethanol, methanol, etc.) of metal salt, such as metal chlorides or nitrates (e.g. iron nitrate, aluminum chloride, lanthanum nitrate, etc.)

The aerogel precursor solution may be filled into the empty space of the 3D printed template via any suitable method. For example, the aerogel precursor solution may be poured, dropped, extruded, sprayed, spread, etc. onto the 3D printed template until the 3D printed template is saturated with the aerogel precursor solution.

Step 106 of method 100 (see FIG. 1) includes allowing formation of a sol-gel throughout the 3D printed template. Conventional techniques may be used for step 106. According to an illustrative embodiment, an RF-saturated 3D printed template may be allowed to form a sol-gel throughout the 3D printed template by first placing the RF-saturated 3D printed template under vacuum to allow the 3D printed template to be wicked with the RF solution, and subsequently heating the RF-saturated template, e.g., in an oven at approximately 70-90° C. until gelation occurs (e.g., about 48 hours). Once the RF solution infilled in 3D printed template becomes an organic gel, an aqueous solvent (for example, water) may be exchanged for an organic solvent, for example, acetone, ethanol, etc., by repeated soakings of the template in an organic solvent bath. The solvent may be exchanged periodically, e.g., every 24 hours.

In other approaches, the 3D printed template saturated with metal alkoxide precursor may be thermally treated and rinsed following conventional techniques, to form a metal oxide aerogel.

Formation of the sol-gel in step 106 of method 100 may involve drying using conventional techniques, for example, super critical drying with liquid $CO_2$ under pressure. In some approaches in which the sol-gel chemistry may create an aerogel with metal oxides, the 3D printed template structure infilled with metal oxide aerogel, may be calcined in air (rather than in nitrogen as oxides are stable in air).

Step 108 of method 100 includes converting the organic gel to an aerogel throughout the 3D printed template (see FIG. 1). In a preferred embodiment, carbonization of the 3D printed template infilled with the dried organic gel includes converting the organic gel to a carbon aerogel by pyrollization. This step may involve carbonizing the super-critically dried organic gel with the 3D printed template to form an aerogel that may be carbonaceous.

In some approaches, step 108 of method 100 may create an aerogel that includes a metal oxide, for example, silica, alumina, titanium dioxide, tin oxide, iron oxide, magnesium oxide, cerium oxide, etc.

With continued reference to FIG. 1, in one embodiment of step 108 of the method 100, the template may remain after conversion of the sol-gel to the aerogel.

In other embodiments, the template may be removed from the aerogel. In some approaches, the 3D printed template within the organic gel may be removed by pyrolization in which the template is removed during the heating process by forming volatile products containing hydrogen and oxygen. This may occur during conversion of an organic gel to a carbon aerogel. In other approaches, the template may be removed by application of a solvent thereto.

Moreover, in yet another embodiment, the method 100 may create an aerogel that may have defined regions with different densities upon removal of the template therefrom. The porosity may be designed by control of the template and/or sol-gel chemistry.

The product created following the method 100 (see FIG. 1), may include an aerogel having inner channels corresponding to outer walls of a three-dimensional printed template around which the aerogel is formed. In some approaches, the template may remain in the product. In other approaches, the template may not be present in t product.

In a preferred embodiment, the polymer material of the 3D structure template may be created using a photo-activated resist and be different from e aerogel surrounding the template such that carbonization simultaneously may carbonize the aerogel as well as decompose and remove the template. Thus, the resultant structure may be a 3D carbon aerogel structure with continuous open channels defined by the position of the printed plate that has been removed.

In some approaches, the aerogel of the resultant structure may include a metal oxide.

Moreover, in another embodiment, the aerogel may have distinct regions with different densities upon removal of the template therefrom. In yet another embodiment, the structure may be continuous thereby allowing a continuous channel through porous material (e.g. the carbon aerogel).

In one embodiment, the template may be present in the product such that the 3D printed polymer template may coexist with the aerogel.

In the embodiments included herein, various additive manufacturing technologies may be combined to create one aerogel structure with different length scale structures. Projection micro-stereolithography may be employed for larger, centimeter-sized 3D printed templates with tens of micron resolution Two photon polymerization depolymerization may be employed to create millimeter-sized 3D printed template structures with sub-micron resolution. The sol-gel process may be employed to create infill aerogels with tunable composition and structure on the nanometer scale.

In some approaches, spatially non-uniform materials may be created with precise control over the shape of the template and the corresponding pores in the aerogel. For example, graded density materials may be engineered to have a higher density at one end of the sample and lower density at the other end. Furthermore, yet another approach may create a sample which has large pores on one side of the sample and small pores on the other side of the sample.

In a preferred embodiment, one may control the directionality of the pores of the aerogel 3D structure created by template such that at least some of the pores may be oriented along generally one direction. The material may or may not be anisotropic. In some approaches, these template-defined macroporous structures may also provide transport highways, thereby allowing materials to more easily pass through the length of the structure.

As noted above, discrete structures may be created. In other approaches, the structures can be created in a continuous process. For example, the continuous manufacture of an aerogel structure with defined channels may be effected by creating a continuous 3D printed template followed by infilling and formation of the aerogel therealong. Large scale manufacturing techniques such as roll-to-roll processes may be employed to create sheets of tunable and tailored 3D aerogels. Portions may be cut from the continuous sheet of 3D aerogels into desired shapes.

In use, aerogels having inner macroporous channels corresponding to outer walls of a three-dimensional printed template may have a hierarchical porous architecture that have features such as: low electrical resistivity, high surface area, tunable pore sizes that may substantially improve mass transport of ions for electro-chemical applications, etc. Various products described herein may be used for energy storage applications, for example fuel cells, rechargeable batteries, advanced catalyst supports, thermal insulation, super capacitors, electrode materials, etc.

In biological applications, the embodiments included herein may create structures that mimic nature's complex membrane designs and may provide substrates to support cell growth. Furthermore, the embodiments described herein may be applied to desalination industries that utilize large scale manufacture filters with tunable pore sizes.

In laser physics technology, the embodiments included herein may provide carbon aerogel materials with tunable density, e.g., for laser targets. Moreover, engineered density gradients within the carbon aerogels to help reduce hydrodynamic instabilities associated with laser physics experiments.

EXPERIMENTAL EXAMPLE

Step 1: Create a 3D Printed Template

In one experiment, the inventors used a NanoScribe printer to create a 3D printed template in the form of disks at 100 μm thick and 1.5 mm in diameter. Each disk in the experiment was a hierarchical series of structures comprising over 1,500 individually printed 100×100×16 μm$^3$ blocks layered in a running brickwork pattern. Each block had a log-pile architecture, i.e., a series of stacked linear lines. The direct laser written lines had about a 3-to-1 (width) aspect oval shape that was fixed by the nature of TPP. The width of the voxel was adjusted by tuning the laser power, but was fixed to approximately 600 nm.

The inventors used NanoScribe's proprietary resist, IP-DIP, an acrylic-based resin of (greater than 75%) of pentaerythritol triacrylate to create the 3D printed templates. Printing was carried out up-side-down onto indium tin oxide (ITO)-coated glass slides by dip-in laser lithography (DiLL) mode. Following removal of residual resist with propylene glycol monomethyl ether, structures were immersed in an isopropanol bath containing 1 wt % irgacure 651 and post-cured under 365 nm UV light for a period of 0.5 hours. The 3D printed template structures were then allowed to air dry. Removal of the 3D printed template structures from the glass slides were carried out by either dissolving the ITO layer with Zn/HCL rinse, or using a razor blade to wedge the 3D printed template structures from the substrate.

Step 2: Infill Template with an Aerogel Precursor Solution

Continuing in this experiment, the inventors used an RF solution to infill the gaps of the 3D printed template to create aerogel through organic sol-gel chemistry. The water-based RF solution was prepared by dissolving 1.23 grams (g) of resorcinol with 1.79 g of 37% solution of formaldehyde and 40 milligrams (mg) of anydrous sodium carbonate with 0.7 g of distilled water.

The inventors carefully placed the 3D printed template which was a disk of approximately 1.5 mm in diameter and 100 μm thick on a glass plate. Droplets of the RF solution were poured or leaked onto the 3D printed template until the 3D printed template became saturated with the RF solution.

Step 3: Allow the Formation of a Sol-Gel

The inventors placed the RF-saturated 3D printed template on the glass plate in a vacuum desiccator for an hour so that the open pores of the 3D printed template completely filled with the RF solution, Next, the RF-saturated 3D printed template was placed in an oven at 80° C. for 48 hours for gelation to occur. Once the RF solution. infilled in the 3D printed template became an organic gel, aqueous solvent was removed by soaking the sample in an acetone bath for 3 days. During this period, the solvent was exchanged every 24 hours.

Finally, the 3D printed template infilled with gelled RF solution was super critically dried in liquid $CO_2$ at a critical temperature of 55° C. and at a pressure range of 1200-1400 psi.

Step 4: Convert the Sol-Gel to Aerogel

In this experiment, the inventors converted the sol-gel to the aerogel by carbonization. The 3D printed template filled with RF aerogel was subjected to a heat treatment process in which the samples were heated in a tube furnace under nitrogen atmosphere at 1050° C. for 3 hours with a heating and cooling rate of 2° C./minute. The 3D printed template within the organic aerogel was simultaneously removed during the heating process by forming volatile products containing oxygen and hydrogen as the organic gel was carbonized.

Aerogel Formation Using a 3D Printed Template with 100 μm Thickness

Figure 4A:
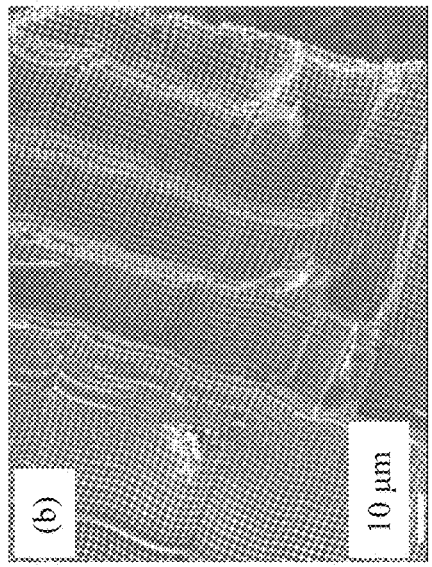
FIG. 4A is scanning electron micrograph of a carbon aerogel with 3D interconnected channels according to one embodiment.
Figure 4B:
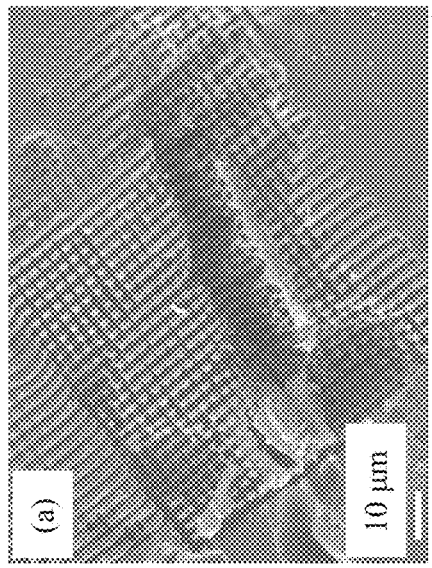
FIG. 4B is scanning electron micrograph of a side view of a carbon aerogel with 3D interconnected channels according to one embodiment.
Figure 4C:
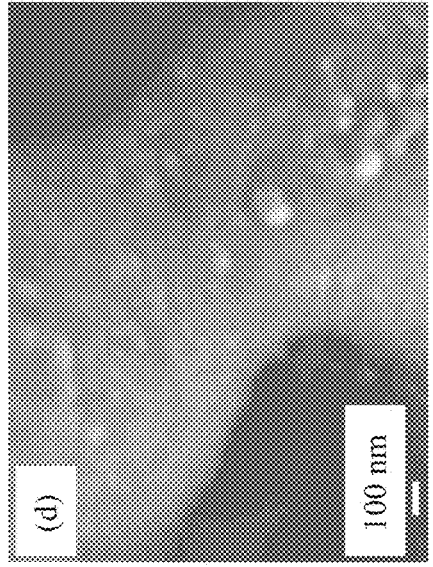
FIG. 4C is a scanning electron micrograph image of an aerogel at a higher magnification according to one embodiment.
Figure 4D:
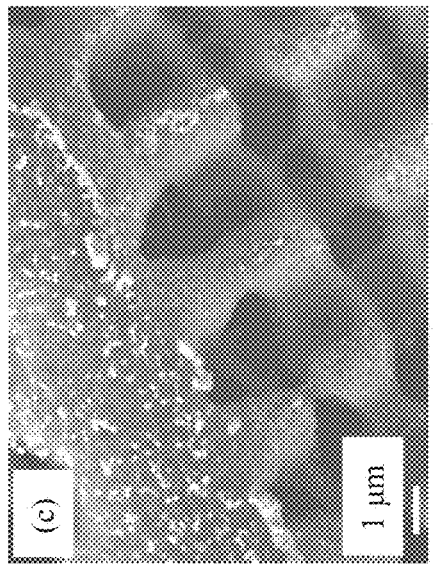
FIG. 4D is a scanning electron micrograph image of the porous morphology of the walls of the aerogel according to one embodiment.

The product of the experiment using a 3D printed template with 100 μm thickness is illustrated in the scanning electron micrographs of FIGS. 4A-D. FIGS. 4A-B show a carbon aerogel with 3D interconnected channels at low magnification (10 μm) with a top view (FIG. 4A) and a side view (FIG. 4B). A higher magnification (1 μm) of the carbon aerogel is shown in FIG. 4C. The porous morphology of the carbon aerogel negative structure may be observed in the even higher magnification (100 nm) of the aerogel in FIG. 4D.

Further illustrations of this experiment are shown in the scanning electron micrographs in FIGS. 5A-F which shows a series of increasing magnification images of one sample using scanning electron microscopy. As shown in FIGS. 5A-B, the aerogel contains large pores that may represent directional mass transport highways for efficient and directed material transport. At higher magnification, shown in FIGS. 5C-D, smaller features and pores are apparent. And at even higher magnification, as shown in FIGS. 5E-F, distinct nanoscale features and pores are present on the single aerogel sample.

Aerogel Formation Using a 3D Printed Template with 1000 nm (1 mm) Thickness

Figure 6A:
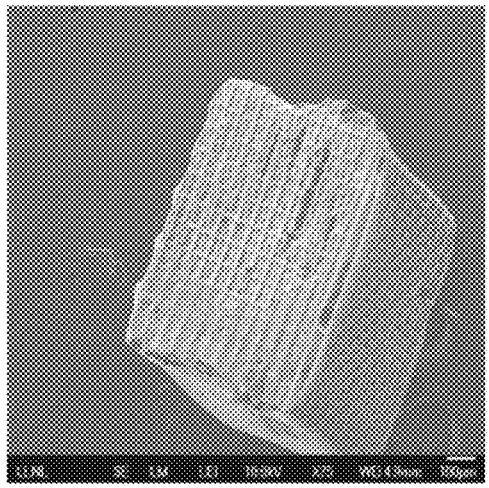
FIGS. 6A-D is a series of scanning electron micrograph images of increasing magnification of a single sample of aerogel according to one embodiment.
Figure 6B:
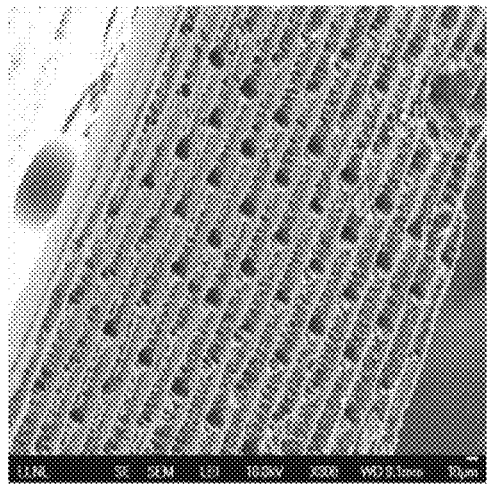
Figure 6C:
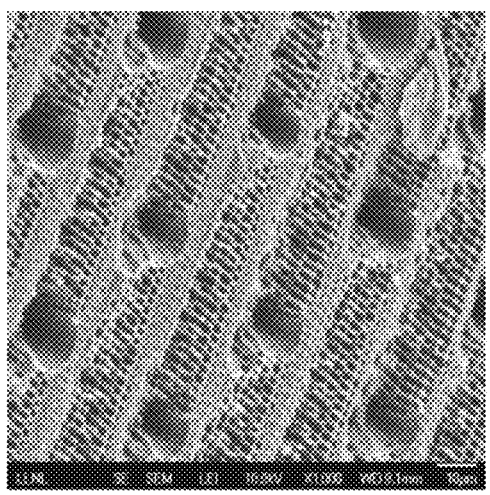
Figure 6D:
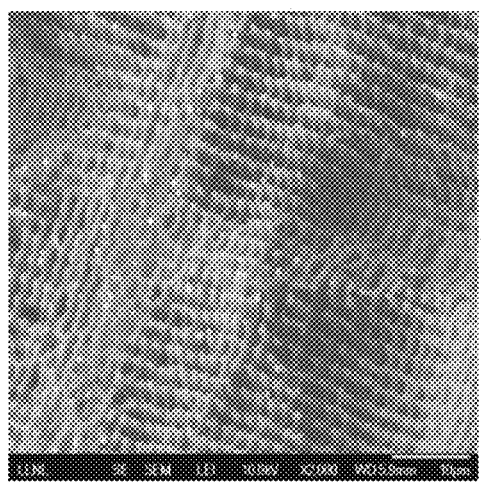

The inventors used TPP techniques to create a 3D printed template with 1000 μm (1 mm) thickness. Using the method described herein, a carbon aerogel was formed using the 3D printed template with 1000 μm thickness, FIGS. 6A-D show SEM images of increasing magnification of the aerogel formed from ese experiments. As shown in FIG. 6A, the aerogel contains large pores that may represent directional mass transport highways for efficient and directed material transport. At higher magnification, shown in FIGS. 6B-C, smaller features and pores are apparent. And at even higher magnification, as shown in FIG. 6D, distinct nanoscale features and pores are present on the single aerogel sample.

The inventive concepts disclosed herein have been presented by way of example to illustrate the myriad features thereof in a plurality of illustrative scenarios, embodiments, and/or implementations. It should be appreciated that the concepts generally disclosed are to be considered as modular, and may be implemented in any combination, permutation, or synthesis thereof. In addition, any modification, alteration, or equivalent of the presently disclosed features, functions, and concepts that would be appreciated by a person having ordinary skill in the art upon reading the instant descriptions should also be considered within the scope of this disclosure.

While various embodiments have been described above, it should be understood that they have been presented by way of example only, and not limitation. Thus, the breadth and scope of an embodiment of the present invention should not be limited by any of the above-described exemplary embodiments, but should be defined only in accordance with the following claims and their equivalents.

What is claimed is:

1. A product, comprising:
an aerogel having inner channels corresponding to outer walls of a three-dimensional printed template around which the aerogel was formed,
wherein a length of some of the channels extends continuously along an entire length of the aerogel,
wherein the template is present in the product.

2. The product of claim 1, wherein the aerogel is carbonaceous.

3. The product of claim 1, wherein the aerogel includes a metal oxide.

4. The product of claim 1, wherein the aerogel has distinct regions with different densities.

5. The product of claim 1, wherein the template is created using a photo-activated resist.

6. The product of claim 1, wherein at least some of the channels have straight longitudinal axes of at least 1 micron in length.

7. product of claim 1, wherein the aerogel is spatially non-uniform.

8. The product of claim 1, wherein the aerogel has a predefined gradient of density.

9. The product of claim 1, wherein a shape of the inner channels corresponds directly to a shape of the outer walls of the three-dimensional printed template around which the aerogel was formed.

10. The product of claim 1, wherein the inner channels are interconnected.

11. The product of claim 1, wherein at least some of the channels have straight longitudinal axes.

12. The product of claim 1, wherein the aerogel comprises a first set of channels having a first size and a second set of channels having a second size, wherein the first size and the second size are different.

13. A method of forming the product in claim 1, comprising:
   acquiring a three-dimensional printed template created using an additive manufacturing technique;
   infilling the template with an aerogel precursor solution;
   allowing formation of a sol-gel; and
   converting the sol-gel to the aerogel.

14. The method of claim 13, comprising removing the template.

15. The method of claim 14, wherein the template is removed by a process selected from the group consisting of: pyrolization and application of a solvent thereto.

16. The method of claim 14, wherein the aerogel has defined regions with different densities upon removal of the template therefrom.

17. The method of claim 13, wherein converting sol-gel to the aerogel includes pyrollyzing the sol-gel.

18. The method of claim 13, wherein the template remains after conversion of the sol-gel to the aerogel.

* * * * *